Nov. 4, 1969
O. A. BOYD
3,476,314
WATER TEMPERATURE CONTROL UNIT
Filed April 18, 1968
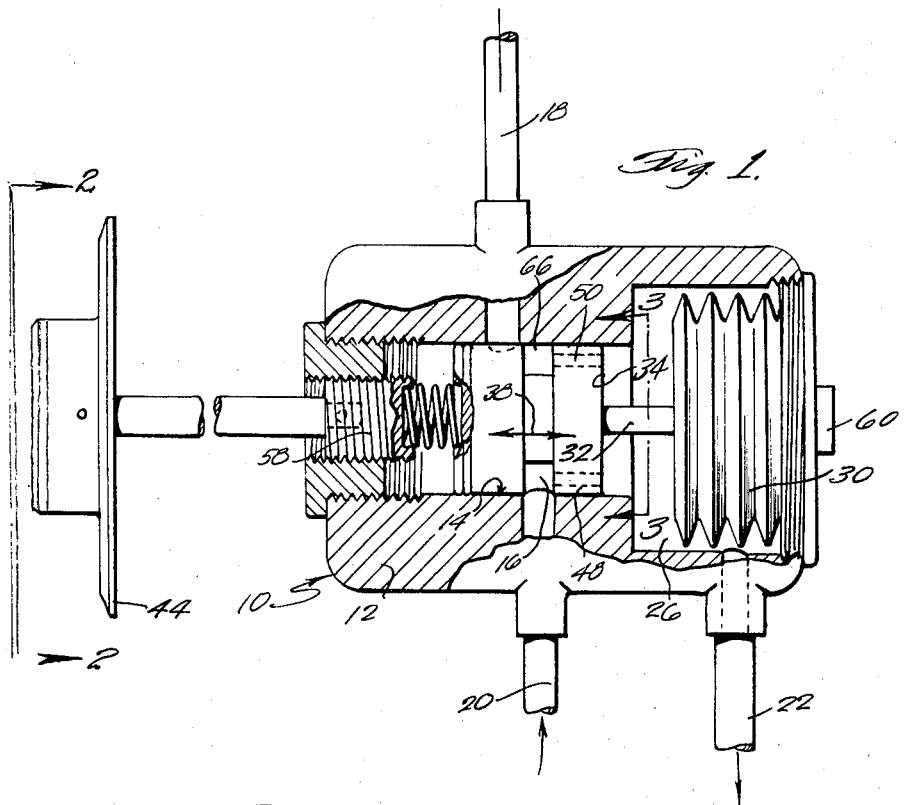
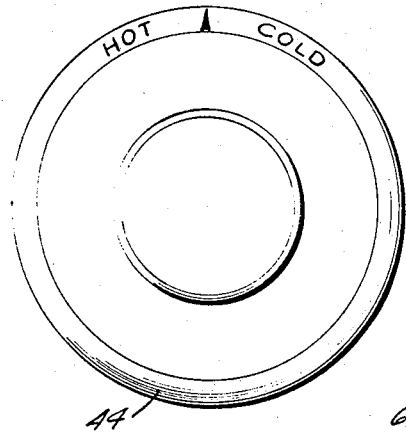
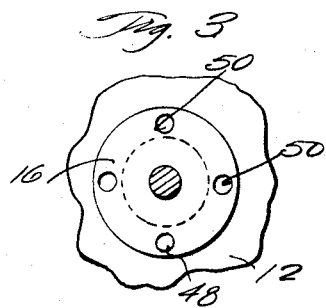
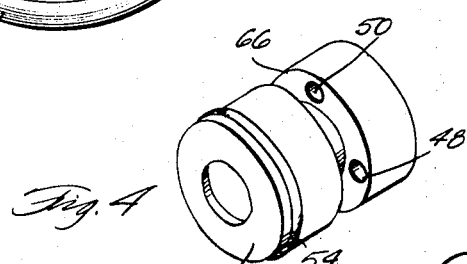
INVENTOR.
OLEY A. BOYD
BY
Victor J. Evans & Co.
ATTORNEYS

United States Patent Office 3,476,314
Patented Nov. 4, 1969

3,476,314
WATER TEMPERATURE CONTROL UNIT
Oley A. Boyd, Rte. 2, Box 125,
Gooding, Idaho 83330
Filed Apr. 18, 1968, Ser. No. 722,429
Int. Cl. G05d 23/02; F16k 3/26
U.S. Cl. 236—12                              4 Claims

ABSTRACT OF THE DISCLOSURE

A water temperature control unit for controlling water flow at a constant temperature set by the position of an indicator or dial, and in which there are bellow means thermally responsive to the water temperature to adjust the piston or water regulator means so that hot and cold water are mixed and the mixture of water flowing out of the unit remains at a constant temperature dependent on the condition and control of the bellows means set by the dial.

---

The present invention relates to a water temperature control unit and more particularly the invention is an improved device in which there is a bellows thermostat in a thermostat chamber for regulating the position of a piston and thus controlling the amount of cold water to hot water being mixed in the arrangement of the invention.

A further and additional object of the present invention is to provide a water temperature control unit that would regulate and keep constant at a set temperature the water that is used in showers, bath water, washbowls, kitchens, laundry rooms, and other locations where it is convenient and necessary to control water at a constant temperature.

The above and other objects and advantages of the invention will become apparent upon full consideration of the following detailed description and accompanying drawings in which:

FIGURE 1 is a cross-sectional view of the improved water temperature control unit according to the preferred embodiment of the invention;

FIGURE 2 is a cross-sectional view taken along line 2—2 of FIGURE 1;

FIGURE 3 is a cross-sectional view taken along line 3—3 of FIGURE 1; and

FIGURE 4 is a perspective view of the control or regulator piston actuated by the bellows thermostat according to the principles and preferred embodiment of the present invention.

Referring now to the drawings, there is shown the water temperature control unit 10 having a casing or body member 12, forming a cavity 14, within which there is slidably engaged within said cavity 14, a piston 16. The cavity chamber 14 is provided with a cold water inlet 18, a hot water inlet 20, and a mixed water outlet 22. Adjacent to the cavity 14 or communicating therewith is a larger cavity 26, that forms and provides the communications from the cavity 14 to the outlet pipe 22. Within the larger cavity or chamber 26, there is a bellows thermostat or bellows thermostatic means 30, that is responsive to the temperature of the water in the environmental chamber about the bellows, and with respect to the water found in chamber 26. The bellows has an actuating stem 32, that engages the rear surface 34 of the piston 16 for actuating or allowing it to pass in either of the directions shown by the arrow 38.

As is seen in FIGURE 1, the piston is moved to the right when the handle or dial 44 is turned, so that the amount of cold water fed into the inlet pipe 18 is adjusted and, accordingly, the water fed in the inlet pipe 20, being hot, is also adjusted and passes through the apertures 48, 50 of the piston 16. The piston is provided with an O-ring 54 to obtain complete shut-off of the water when the piston is in the closed or off position, as indicated by the dial 44.

An adjusting screw or threaded member 58 is provided so that the dial will accordingly provide hot water or cold water from the outlet pipe 22, depending upon the temperature of the water fed in the inlets 18, 20, and controlled by the bellows 30. The cavity 26 may be opened for inspection and maintenance by removal of the plug 60.

It is seen that water flows, during operation of the apparatus of the invention, into the inlet pipe 20, through the grooves and the holes of the piston, seen as holes 48, 50 of piston 16, and into contact with the bellows thermostat means 30. As the hot water contacts the thermostatic means, it tends to expand in length against the plug 60, and thus moves in a leftward direction, and thus the pin 32 extends the piston 16 in a leftward direction to open the holes or aperture ports for inlet of the water through inlet 18, and allowing then cold water to run into the piston groove 66, and then which allows the cold water to contact the thermostat means 30. Then as both hot and cold water are mixed in the thermostatic chamber 26, it regulates the piston 16 and the thermostat means 30 to an equalized position, so that the water is mixed and is allowed to egress from the outlet 22 at a regulated and constant temperature of the water.

Additional embodiments of the invention in this specification will occur to others and, therefore, it is intended that the scope of the invention be limited only by the appended claims and not by the embodiments described hereinabove. Accordingly, reference should be made to the following claims in determining the full scope of the invention.

What is claimed is:

1. A hot water, cold water temperature control unit for controlling flow of water at a constant temperature, comprising a valve chamber having a single valve stem passing through one end thereof, and a closure plug disposed over the thermostat chamber at the other end thereof, a hot water inlet to couple with and communicate with said thermostat chamber, a cold water inlet coupling and communicating with said thermostat chamber, a portion of the chamber therein disposed to receive a piston having apertures passing proportionally therethrough, said piston connected to said single valve stem disposed to have enlarged cylindrical portions at each end thereof, one portion for closing off said hot water inlet and the other for closing off said cold water inlet, a smaller cylindrical portion connecting between said enlarged portions, a bellows thermostatic means engaged to couple against the plug of said thermostatic chamber depending upon and responsive to the flow of heated and cool water passing therethrough, said stem engaging said piston to displace it for regulating the flow of water entering said chamber, and an outlet chamber communicating with said thermostatic chamber for passing the water that has been regulated by the control unit.

2. The invention according to claim 1 wherein a dial handle actuates the position at which the piston serves to regulate the flow of water passing into said thermostatic chamber.

3. The invention according to claim 2 wherein said plug is removable for maintenance and replacement of said bellows thermostatic means and said control piston.

4. The invention according to claim 1 wherein an O-ring is disposed on one of said portions to keep pressure off of the outer end of the piston to equalize pressure in the thermostatic chamber.

References Cited

UNITED STATES PATENTS

| | | | |
|---|---|---|---|
| Re. 24,398 | 12/1957 | Kimball | 236—12 |
| 2,250,815 | 7/1941 | Ruegg et al. | 236—12 |
| 2,369,242 | 2/1945 | Lawler | 236—12 |
| 2,996,082 | 8/1961 | Miner | 137—625.4 |

WILLIAM E. WAYNER, Primary Examiner

U.S. Cl. X.R.

137—625.35